United States Patent Office 3,155,588
Patented Nov. 3, 1964

1

3,155,588

AVIAN PNEUMOENCEPHALITIS VIRUS VACCINE AND METHOD OF MAKING

Raymond A. Bankowski, Davis, Calif., assignor to The Regents of the University of California, Berkeley, Calif.
No Drawing. Filed Sept. 3, 1957, Ser. No. 681,445
4 Claims. (Cl. 167—78)

This invention relates to and in general has for its object the provision of a live virus vaccine for the immunization of chickens against Newcastle disease (also known as pneumoencephalitis), and to a method for producing such vaccine.

Currently, it is the practice to keep all commercial flocks of chickens immunized against pneumoencephalitis. Although various types of vaccines are available, none of them is entirely satisfactory. Killed virus vaccines, such as for example, formalin or crystal violet inactivated virus vaccines are unsatisfactory for they produce an immunity for only about six months, and are insufficient to protect the reproductive tract. From a commercial standpoint, this means a decrease in the egg-producing capacity of hens.

Live virus vaccines currently available and prepared from strains of Newcastle disease virus and injected into the wing-web, although capable of giving a relatively long-lasting immunity, are not satisfactory for from ½ to 12 percent of normal healthy birds are frequently killed when vaccinated therewith, and such vaccines are too potent to be used on chicks younger than three weeks of age. The use of these vaccines can also result in spreading the disease from the vaccinated chickens to susceptible or non-immune chickens.

Likewise, intramuscular type vaccines cannot be used on chickens younger than three weeks of age.

Infections of the respiratory tract caused by more than one agent are known as a "respiratory disease complex," and contributing to the spread of this disease are the vaccines (containing live, virulent producing agents) for laryngotracheitis, fowl pox, infectious bronchitis, and Newcastle disease. The administration of such vaccines increases the concentration of these agents in the area in question, and this perpetuates the disease and constitutes a continuous threat to susceptible birds.

Up to the present time, live virus vaccines have invariably contained embryonating chicken egg tissue, this having been thought essential to the production of the vaccine. Since it has been recognized that egg-borne infections can be transmitted to poultry flocks vaccinated with such vaccines, considerable research has been conducted in an attempt to develop methods and testing procedures for detecting and preventing contaminants in viruses grown in embryonating chicken eggs. However, no practical method has been found for doing this, and furthermore it is becoming more and more difficult to obtain sources of eggs free of pathogens for poultry.

One of the objects of this invention is the provision of a method of completely attenuating avian pneumoencephalitis virus wherein the virus is serially passed through a medium in accordance with the Sabin technique.

Another object of this invention is the provision of a live avian pneumoencephalitis virus vaccine attenuated by its serial passage through an artifical medium and then propagated in a medium free of avian tissue.

Still another object of this invention is the provision of a method for producing a vaccine of the character above described wherein avian pneumoencephalitis virus is propagated and attenuated by its serial passage through an artificial culture medium including a Simms-Sanders salt solution free of blood serum ultrafiltrate and then

2 propagated in a culture medium containing cells such as Hela or bovine kidney cells, but free of avian tissue.

More specifically, and by way of example, a vaccine embodying the objects of my invention can be made in accordance with the following procedure.

*Simms-Sanders Solution*

As above indicated, an artificial medium through which the virus can be serially passed for the purpose of attenuating it includes a modified Simms-Sanders solution, the contents of which can be as follows:

| | Gms. per liter |
|---|---|
| Sodium chloride (NaCl) | 8 |
| Magnesium chloride ($MgCl\cdot6H_2O$) | 0.203 |
| Calcium chloride ($CaCl_2\cdot2H_2O$) | 0.147 |
| Potassium chloride (KCl) | 0.2 |
| Sodium bicarbonate ($NaHCO_3$) | 1.01 |
| Dextrose, C.P. | 1.00 |
| Dibasic sodium phosphate ($Na_2HPO_4$) | 0.213 |
| Phenol red indicator | 0.01 |

Although normally a Simms-Sanders medium, in addition to the list of ingredients above, also includes the ultrafiltrate of blood serum, I have found that for use as an attenuating medium in accordance with my process, the ultrafiltrate may be omitted.

Optionally, the medium above described can be modified by the addition thereto of a para-amino-benzoic-acid, and/or cysteine hydrochloride, and/or vitamins.

The para-amino-benzoic-acid can be added to the medium as a saturated aqueous solution in the order of 1 cc. per 100 mls. of media.

The cysteine hydrochloride can be added in the form of 1 cc. of a 5 mgm. percent solution in distilled water per 100 mls. of media.

The final solution should then be sterilized by any of the procedures used in the standard practice, such as autoclaving or filtration through a Seitz or Morton bacterial filter.

*Culture Medium*

To produce an artificial culture medium within which the avian pneumoencephalitis virus will propagate and through which the virus can be serially passed for the purpose of attenuating it, it is simply necessary to add the living tissue of embryonating chicken eggs to the sterilized modified Simms-Sanders solution above described. More specifically, and by way of illustration, 12 cc. of the modified and sterilized Simms-Sanders solution is added to a first test tube and its pH adjusted preferably to a range in the order of 7.0 to 7.4, although even a broader range of 6.8 to 8.0 is acceptable. To the resulting solution is added fresh, finely chopped living embryonic chicken tissue such as livers and hearts of chicken embryos, and which can be obtained from embryos six to thirteen days of age. As a matter of fact, the entire embryo can be used. The use of too large an amount of tissue may result in excessive respiration and acid production. The optimum amount of tissue has been found to be in the order of 2 grams of tissue per 100 cc. of solution.

*Culture*

The artificial culture medium so produced and contained in said first test tube is then inoculated with avian pneumoencephalitis virus. For this purpose, the California 11914 strain of Newcastle disease virus has been found to be satisfactory, for in its unmodified form it is very virulent, and has a wide distribution among the various laboratories of the United States where it is employed in experimental and diagnostic work. As a source of such virus the finely chopped hearts of two chicken embryos inoculated with the virus some 36 hours earlier has proved to be satisfactory. Approximately 0.2 gm. of such material is added to the contents of said first test tube, and the contents of the tube incubated at 37° C. for about 72 hours, and then at room temperature for an additional 24 hours.

Following this, the supernatant is withdrawn from said test tube and 0.25 cc. thereof added to 12 cc. of fresh culture medium (Simms-Sanders solution plus chicken tissue) contained in a second test tube. This second inoculation then constitutes a second serial passage, and the contents of the second tube is incubated for three days at about 37° C. and then at room temperature for an additional 24 hours before a third and identical serial passage is made. In this manner the virus is serially passed through the artificial culture medium until the virus has become attenuated as demonstrated by the inoculation of a non-immune chicken with a normally lethal dose of the serial passage in question. Although normally only the supernatant fluid of a given serial passage was used as the inoculum between passages, I have demonstrated that an inoculum consisting of the supernatant fluid plus its associated tissue yielded higher virus concentrations than the supernatant fluid alone. However, the additional steps necessary in doing this were not justified for the serial passage and attenuation of the virus.

Signs of Attenuation

By attenuation is here meant the modification of the virus to such an extent that it has lost its killing power but still has retained its ability to immunize. Some evidence of attenuation of the virus was noted in the first ten serial passages. Elimination of the disease-producing factor was decreased from 100% to approximately 5% after 40 serial passages. Further modification by serial passing the virus through 55 passes resulted in no significant mortalities when the suspension was inoculated intramuscularly or given by the air-borne route. In some instances the mortality was nonexistent in birds of an older age or when a small number of birds were subjected to this virus, but repeated experimentation showed that the suspension contained a paralytic and/or lethal factor which was demonstrable when administered to large numbers of birds (1,000). In addition, the virus was lethal to very young chicks (48 hours old) when given by the intramuscular route.

Removal of Lethal Factor From the Suspension

To eliminate the paralytic factor and lethal factor for young chicks a series of experiments were begun with the 47th serial passage in Simms-Sanders medium without the ultrafiltrate. The latter was found to be unnecessary for maintaining growth of the virus. This virus was alternately serially passed through a medium containing the bovine ultrafiltrate and tubes without the serum ultrafiltrate for 16 serial passages which constituted 63 serial passages from the original inoculum. This process did not eliminate the paralytic or lethal factor.

The serial passages were continued using a well-recognized technique known as the Sabin technique of rapid passage, this technique being on page 290, beginning with line 13 of The Dynamics of Virus and Rickettsial Infections, edited by Hartman, Horsfall and Kidd, and published by Blakiston Company Inc., New York. Using the 16th alternate passage above (original serial passage 63) the virus was inoculated into Simms-Sanders medium without the serum ultrafiltrate but the incubation period was reduced to 24-hour intervals at 37° C. and inoculating each new tube of medium with 20% of the previous passage. After nine such rapid serial passages, the virus was tested and found to be free of the lethal factor but maintained the desirable characteristics (1) produced a good immunological response (2) did not spread from vaccinated birds to susceptible birds, and (3) could be given to chicks as early as 5 days of age without inducing any symptoms or other untoward effects.

The lethal or paralytic factor was eliminated between the 63rd and 74th serial passage since preparation of the virus by the usual procedure using the Simms-Sanders medium without bovine ultrafiltrate and incubating for 72 hours at 37° C. with an additional 24 hours at room temperature resulted in suspensions having only the desirable characteristics. Further proof that the lethal factor was eliminated was when the virus was serially passed through chicken embryonating eggs and using tissue and fluids of the dead embryos for injection into chickens. The 57th serial pass when inoculated into embryos resulted in the production of embryonic tissues containing the virus which caused paralysis and death when inoculated into chickens. Serial passage of the 82nd passage virus through embryonating eggs did not result in embryonic tissues which contained the virus having the lethal factor.

Propagation of the Virus in Tissues Other Than the Embryonating Egg

Having attenuated the virus, the suspension is inoculated into test tubes containing growing Hela or fetal bovine kidney tissue cells. The technique of growing Hela or bovine kidney tissues in modified Earle's salt solution, or other suitable nutrient salt solution, is a standard practice conducted in many laboratories throughout the nation.

The Newcastle disease virus is propagated on these tissues and the supernatant fluid constitutes the vaccine.

As above indicated, the modified Earle's salt solution medium for the Hela cells and fetal bovine kidney cells in which the attenuated Newcastle disease virus is propagated contains:

| | Gm. per liter |
|---|---|
| Sodium chloride (NaCl) | 6.8 |
| Potassium chloride (KCl) | 0.4 |
| Calcium chloride ($CaCl_2$) | 0.2 |
| Magnesium sulfate ($MgSO_4 \cdot 7H_2O$) | 0.2 |
| Sodium acid phosphate ($NaH_2PO_4 \cdot H_2O$) | 0.14 |
| Glucose (C.P.) | 1.0 |

To each liter of solution prepared with the above list of ingredients, the following reagents are added:

| | Grams |
|---|---|
| Lact-albumin hydrolysate | 5.0 |
| Glucose | 4.5 |
| Yeast extract | 1.0 |
| $NaHCO_3$ | 1.1 |
| Phenol red | .01 |

The above solution is filtered through a Seitz or Morton bacterial filter.

Penicillin at the rate of 250 units and 0.25 microgram of dihydrostreptomycin per ml. of fluid can be optionally added to the above medium.

Hela Cells

Cells were obtained from the 103rd passage level of the X4–5 line of Hela cells (originally obtained November 1954 from Microbiological Associates, Bethesda, Maryland) through the courtesy of Doctor Lennette of the California Public Health Laboratory. The culture was maintained in 200-ml. milk dilution bottles. Each bottle was inoculated with approximately one million cells suspended in modified Earle's solution containing 10% human serum. Once growth was established, usually in three to five days, and the medium became acid, modified Earle's solution containing 6% lamb serum was used as the replacement medium.

When the cells in the dilution bottles reached maximum growth, usually in five to seven days, they were inoculated with 0.25 ml. of the attenuated strain of Newcastle disease virus. The tissue culture was incubated at 37° C. for 48 hours or as soon as the destructive action of the virus upon the sheath of cells in the tube could be detected. The supernatant fluid of the culture was removed which constituted the vaccine.

It was found that several serial passages in the Hela cell cultures were necessary to produce or propagate the virus in concentrations of higher magnitude (100,000 to 1,000,000 chicken embryo infective doses per .1 ml. suspension) to be of a more practical and economical value.

Bovine Fetal Kidney Cells

The kidney cells were obtained from kidneys of fetuses of cattle brought to a local slaughterhouse in the fifth to eighth month of gestation. The kidneys were removed under sterile conditions and the encapsulated kidneys suspended in Dulbecco's phosphate buffer solution (PBS). Within one hour after removal from the animal they were minced and trypsinized in 0.25% trypsin in PBS as described by Dulbecco and Vogt.

The cells suspension was centrifuged at 800 r.p.m. and resuspended in the liquid culture medium to make a final cell dilution of 1:200. Two-ml. amounts of the suspension were placed in pyrex screw-cap test tubes (16 x 125 mm.). Incubation was carried out in stationary racks at 35° C. for 48 to 72 hours. When the pH of the liquid medium dropped to the acid side (6.7 or less), it was replaced with the same amount of fresh medium. Usually by the sixth or seventh day the tubes presented a contiguous sheath of cells and were ready for inoculation. The tubes were inoculated and the virus harvested in the same manner described above with Hela cells; however, the Hela cells were more readily available than the bovine kidney cells and therefore a more desirable method for propagating the virus.

It was shown that the attenuated strain of Newcastle disease virus can be propagated in either the Hela cell or the bovine fetal kidney cell; however, high concentrations of virus could not be readily obtained until it was serially passed through the new cell medium system. Concentrations of 1 million particles per 0.1 ml. of suspension were attained with the attenuated virus after 17 serial passages through the Hela cell cultures. The number of passages required to produce virus concentrations high enough to be of practical value for vaccine production will vary with the strain of virus used. The GB strain of Newcastle disease virus which is highly virulent capable of producing 100 percent mortality in chickens resulted in excellent growth and concentrations in the same Hela cell culture tubes by the 14th serial passage.

Experiments With the Vaccine

Experiments with the vaccine prepared in either the chicken embryonating tissue or Hela cells have been conducted. It has been found that 0.25 cc. of the vaccine containing 10,000 chicken embryo infective doses of the virus per 0.1 cc. when given to chicks as early as 5 days of age would produce an immunity which was 100 percent effective for as long as 13 weeks. This period of immunity is of particular importance for poultrymen raising broilers.

In laying birds, the vaccine was found to produce an excellent immunity when two doses of the vaccine are given 9 weeks apart. The immunity has been tested and shown to be effective for as long as 64 weeks which was the longest period tested. Over 60,000 doses of the vaccine have been administered to chickens of various ages and in no instance were symptoms of the disease or any untoward reactions in the birds noted; however, a good immunity was demonstrated in all cases.

Other strains of Newcastle disease virus can also be attenuated by serial passage. This was demonstrated in another experiment where the GB strain (which is the most virulent strain of Newcastle disease virus ever to be isolated in the U.S.) was serially passed through a liquid medium (Earle's modified A solution) containing lamb serum and fragments of chicken embryonating eggs. This procedure was exactly the same as I used in the Simms-Sanders medium technique with the California 11914 strain.

I claim:

1. The method of producing a live virus vaccine for Newcastle disease comprising: propagating and attenuating avian pneumoencephalitis virus by serially passing said virus through a Simms-Sanders solution maintained within in a pH range of 6.8 to 8.0 and containing living chicken tissue until said virus has become attenuated and then propagating the virus so attenuated in an artificial medium containing live bovine kidney tissue, but free of avian tissue.

2. The method of producing a live virus vaccine for Newcastle disease comprising: propagating and attenuating avian pneumoencephalitis virus by serially passing said virus through a Simms-Sanders solution maintained within in a pH range of 6.8 to 8.0, and containing living chicken tissue until said virus has become attenuated and then propagating the virus so attenuated in an artificial medium containing living Hela cells and free of avian tissue.

3. The method of producing a live virus vaccine for Newcastle disease comprising: propagating attenuated avian pneumoencephalitis virus in an artificial medium containing living bovine kidney cells, but devoid of living avian tissue.

4. The method of producing a live virus vaccine for Newcastle disease comprising: propagating attenuated avian pneumoencephalitis virus in an artificial medium containing Hela cells, but devoid of living avian tissue.

References Cited in the file of this patent

Reagan: Proc. Soc. Exptl. Biol. and Med., vol. 73, February 1950, pp. 241–243.

Sanders: A.M.A. Archives of Pathology, vol. 56, No. 2, August 1953, p. 199.

Henle: Proc. Soc. Exptl. Biol. and Med., vol. 89, No. 4, August–September 1955, pp. 556–560.